Oct. 4, 1932.  C. BIRDSEYE  1,880,232
REFRIGERATING APPARATUS
Filed April 10, 1929  2 Sheets-Sheet 1
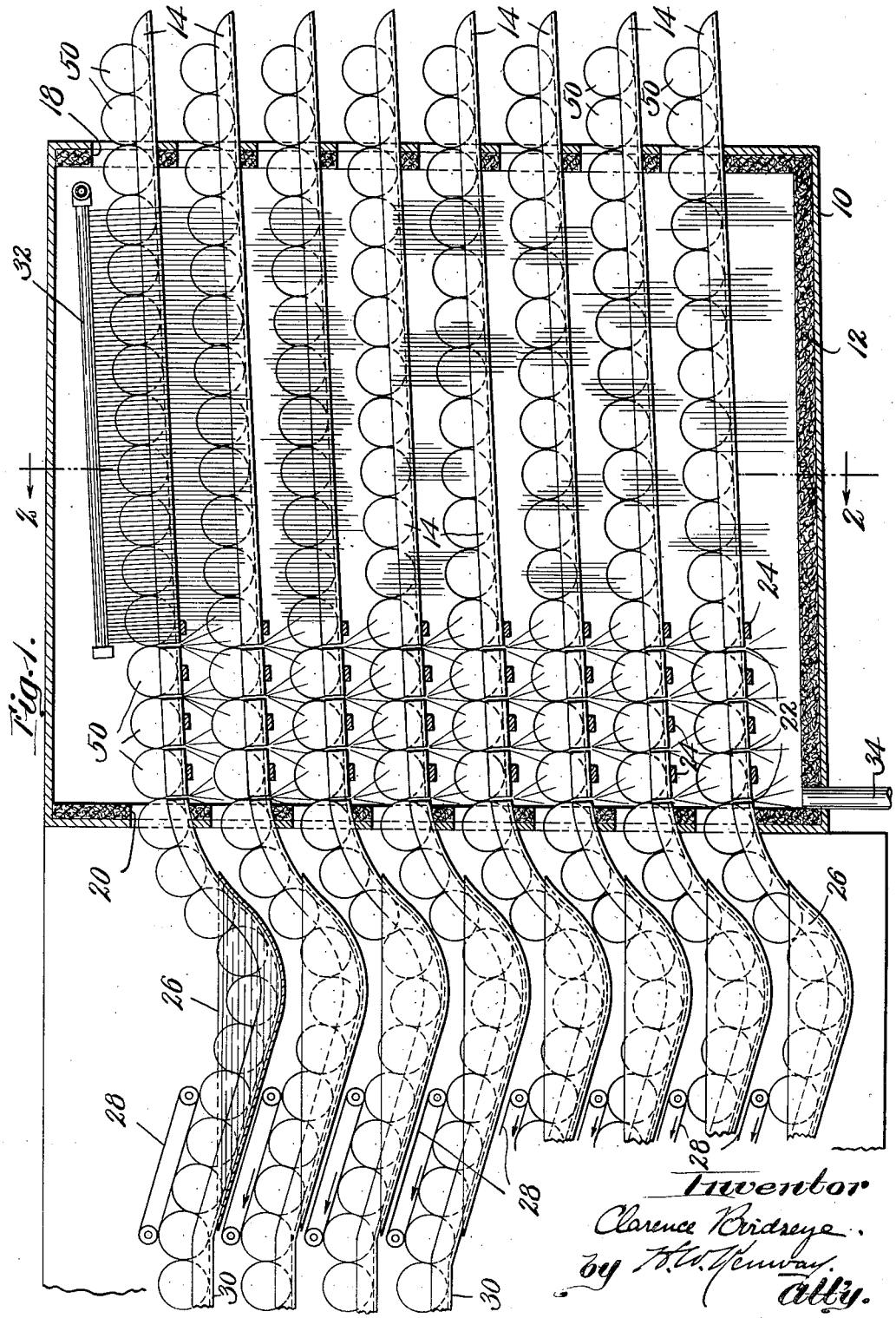

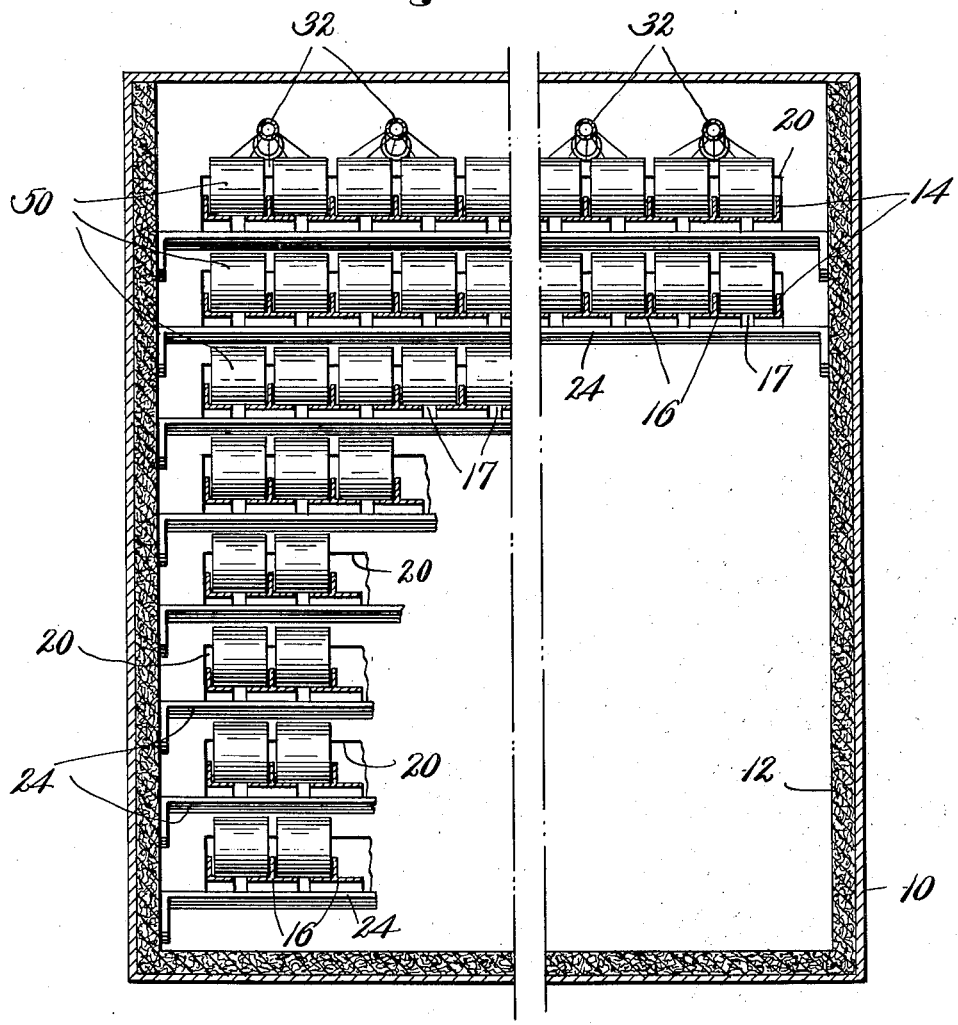

Patented Oct. 4, 1932

1,880,232

UNITED STATES PATENT OFFICE

CLARENCE BIRDSEYE, OF GLOUCESTER, MASSACHUSETTS, ASSIGNOR, BY MESNE ASSIGNMENTS, TO FROSTED FOODS COMPANY, INC., OF DOVER, DELAWARE, A CORPORATION OF DELAWARE

REFRIGERATING APPARATUS

Application filed April 10, 1929. Serial No. 354,103.

This invention relates to refrigerating apparatus for use in freezing or quick-freezing food products put up or packaged in containers.

A characteristic feature of quick-freezing is the removal of heat from the food product at a rate sufficiently fast, in the case of fresh food products such as fish or meat, to maintain the pristine qualities, flavor and structure of the product unimpaired. The product is maintained in this condition while frozen and when thawed exhibits all the qualities of the original fresh comestible. Quick-freezing may be conveniently effected by subjecting the packaged comestible to the action of a liquid cooling medium at a low temperature for a definite interval of time.

In one aspect, the present invention consists in apparatus by which comestibles in containers may be quick-frozen in a continuous process manner under economical and commercially practical conditions. In effecting the desired result, I contemplate causing a series of containers to pass along a predetermined path and during their progress flowing a liquid cooling medium over them. To this end, an inclined runway is provided along which the containers may travel, preferably under the influence of gravity, and associated with which is a pipe or other means for flowing cooling medium over the containers upon the runway.

Preferably, and in accordance with another feature of the invention, the rate of travel of the containers is controlled by the rate of discharge from the runway of the refrigerated containers. As herein shown, this is effected by providing a dip or depression in the runway adjacent to its delivery end, in which the containers will be so disposed as to balance the gravitational tendency to move of the series in the runway. Accordingly, as successive containers are removed from the dip, others are supplied from the runway and an orderly travel of the containers at the desired rate is thus ensured.

With a view to increasing the capacity of the apparatus and securing economy in the action of the cooling medium, I propose to provide a plurality of runways arranged vertically in banks and of such construction that the cooling medium may flow by gravity from one runway to the next, thus cooling the containers therein in consecutive stages. In this manner, a single supply system may be utilized to refrigerate the contents of a substantial number of runways. By arranging the banks of runways closely adjacent to each other, still further efficiency in the distribution of the cooling medium may be secured.

The cooling medium may be of any suitable or preferred character. If a brine solution is used, it is desirable to remove this from the refrigerated containers by washing. In accordance with another feature of the invention, a tank for cleansing fluid is associated with each of the runways and this may be advantageously combined with the dip or depression already referred to as controlling the rate of travel of the containers along the runway. Accordingly, as herein shown, the depression in the runway is so located as to direct the containers into and through a tank containing water or other cleansing fluid effective to remove the brine from the refrigerated containers.

These and other features of the invention will be best understood and appreciated from the following description of a preferred embodiment thereof, selected for purposes of illustration and shown in the accompanying drawings, in which Fig. 1 is a view in side elevation of one bank of runways, the refrigerating chamber being shown in section; and Fig. 2 is a view in cross section on the plane 2—2 of Fig. 1.

While I have referred specifically to fresh meat and fish as examples of comestibles which it may be desired to quick-freeze, it should be understood that the apparatus of the present invention is of general application and may be used for refrigerating any comestible, including seafood of all sorts, fruit, vegetables, ice cream, bakery products, etc. For purposes of illustration, the containers are shown as cylindrical cans 50 of substantially equal diameter and height. These are readily obtainable in commercial quantities and are convenient to handle, although containers of any shape adapted to be passed along a runway may be handled advantageously in the apparatus.

An insulated chamber is provided having an outer casing 10 and a thick layer of heat insulating material, such as cork, disposed within the casing. The front wall of the insulated chamber is provided with a series of openings 18 and the rear or delivery wall is provided with a series of openings 20, each located at a slightly lower level than its corresponding opening in the front wall. An inclined runway extends across the chamber at a slight downward inclination from one opening to the other. The runways are formed of outer L-shaped channel irons 14 and intermediate T-shaped channel irons 16, as best shown in Fig. 2. The upstanding flanges of the channel irons guide the containers 50 in their travel along the runway. The horizontal flanges of the channel irons are spaced apart so as to provide a longitudinally-extending slot or opening in the bottom of each runway. The runways extend a substantial distance without the openings 18 of the insulated chamber, thus affording a table upon which the containers 50 may be placed in presenting them to the apparatus.

As each runway passes out of the insulated chamber through a delivery opening 20, it is formed into a dip or depression, dropping sharply from the opening 20 and them merging into a reversely inclined section. The circular or cylindrical containers 50 tend to roll slowly along the runway and to maintain contact with each other. The effect of those located upon the reversely inclined portion of the runway in the dip is to balance the gravitational pressure of the line in the main portion of the runway, so that when the runway, including the dip, is full of containers, a condition of equilibrium is established and there is no travel of the series of containers.

Beyond the dip, each runway merges into a horizontal portion 30 which serves to hold the refrigerated containers until removed for shipment or storage. Any suitable means may be provided for feeding the containers up the reversely inclined portion of the runway and delivering them to the horizontal portion 30. As herein shown, a short endless belt conveyor 28 is associated with each runway, serving to engage four of the containers upon the reversely inclined portion of the runway and acting to roll them up the incline and deliver them to the horizontal portion 30. It will be understood that as these containers are advanced up the incline, the gravitational pressure of the series is sufficient to advance the containers immediately to replace those delivered.

As already explained, the runways are arranged in vertical banks and the banks of runways as a whole are disposed in parallel relation, as shown in Fig. 2. Located above each pair of banks is a longitudinally-extending pipe 32, perforated in its lower side and co-extensive with the main portion of the upper inclined runways. A cooling medium, such as calcium chloride brine at a temperature in the neighborhood of $-45°$ F., is supplied by the pipe 32 and caused to flow in a narrow vertical stream upon the series of containers 50 resting in the uppermost pair of inclined runways. The brine strikes the uppermost cylindrical surfaces of the containers and flows down over their vertical faces, completely enveloping and refrigerating the series of containers. It falls by gravity from the uppermost series of runways, passing over the outer channel iron 14 and also down through the longitudinal slot between the channel irons 16, thus reaching the series of containers in the second series of runways. Thence, it passes to the third series of runways, and so on to the bottom of the chamber, in each case similarly enveloping and refrigerating the series of containers. The cooling medium thus acts in a multiple stage effect which, in practice, has been found very efficient and which involves a negligible temperature increase in the brine between the uppermost and the lowermost runways.

In order to prevent the brine from running out of the insulated chamber along the runways, a series of transverse slots or openings 22 are provided in each runway adjacent to the delivery end thereof and out of range of the brine supplied by the pipe 32. These slots act to interrupt the flow of brine in the runway and cause it to flow out and fall to the bottom of the chamber. In passing along this transversely-slotted portion of the runway, each container is given an opportunity to drain, so that comparatively little brine is carried out of the insulated chamber upon the surfaces of the containers. The brine delivered by the pipe 32, which eventually reaches the bottom of the chamber, is collected by an outlet pipe 32 and recirculated to the refrigerating machine included in the system.

In order to remove all trace of brine from the refrigerated containers, a tank 26 is provided at the point in each runway where the dip is formed. Each tank, as shown in Fig. 1, contains water or other cleansing fluid and in passing through the dip in the runway each container is carried through the cleansing fluid in the tank, so that it reaches the horizontal delivery portion 30 of the runway in a clean condition.

It will be noted that the containers 50 are slightly narrower than the runways upon which they are contained, so that there is space between the containers and the upright flanges of the runways for a stream of brine which runs rapidly along each runway, flowing past the containers maintained at a lower level therein. The refrigerating effect upon the containers is, therefore, due partly to the enveloping flow of the cooling medium supplied from above and partly to the stream of cooling medium which flows past them and along the runway. The cross slots 22 permit the escape of the entrained liquid from the runways as well as that which is drained from the containers standing in the lower part of the runways.

While I have shown containers of cylindrical shape which will roll by gravity along the runways, I contemplate also using flat-sided containers which will slide by gravity along the runways, and the latter may be arranged at any angle suitable for such containers or supplementary means may be provided for assisting them in their passage along the runways if their coefficient of friction should be too high to permit them to move freely under the influence of gravity alone. In the accompanying drawings, I have shown a single pipe 32 arranged above each pair of vertical banks of runways. While this arrangement is satisfactory, it is of secondary importance only and it would be within the scope of my invention to provide an adequate supply of liquid cooling medium in any suitable manner and to discharge the same at any desired points within the apparatus.

Having thus described my invention, what I claim as new and desire to secure by Letters Patent is:

1. Refrigerating apparatus including an inclined runway for holding a series of circular containers arranged in contact with each other, power operated means for controlling the rate of movement of said containers along the runway, said means being arranged to engage the containers while resting on and traveling along the runway, and means for flowing liquid cooling medium over the containers.

2. Refrigerating apparatus including an inclined runway along which a series of containers may pass by gravity, means for controlling the rate of removal of the containers from the lower end of the runway, said means being arranged to engage the containers while resting on and traveling along the runway, and a pipe co-extensive with a higher portion of the runway for directing a defined stream of liquid cooling medium to the containers therein.

3. Refrigerating apparatus including an insulated chamber, an inclined runway therein for guiding a series of containers, a pipe disposed parallel to the runway and above the same for directing a defined stream of liquid cooling medium upon the containers in the runway, and means for controlling the rate of movement of the containers to and from said insulated chamber, said means being arranged to engage the containers while they rest on and travel along the runway.

4. Refrigerating apparatus including an insulated chamber, a plurality of inclined runways therein disposed in substantially vertical alignment and each acting to guide a series of containers moving under the influence of gravity, and means for supplying liquid cooling medium to the containers in the uppermost runway, whereby it may fall successively upon the containers in the lower runways.

5. Refrigerating apparatus including an insulated chamber, an inclined runway therein for guiding a series of containers moving under the influence of gravity, the runway being arranged to extend without said chamber, means for supplying liquid cooling medium to the containers upon the runway within said chamber, and means for preventing the cooling medium from flowing along the runway to escape from the chamber.

6. Refrigerating apparatus including an insulated chamber, an inclined runway extending therethrough for guiding a series of containers moving longitudinally along it under the influence of gravity, said runway having an opening extending transversely across its bottom within the chamber for the escape of liquid traveling downward along the runway, and means for flowing liquid cooling medium over the containers in the runway above said opening.

7. Refrigerating apparatus including an insulated chamber, means outside the chamber for admitting a series of containers one after another to said chamber at one level and for delivering said containers at a predetermined rate from the chamber at a lower level, and means for flowing a defined stream of liquid cooling medium over said containers in their passage through said chamber.

8. Refrigerating apparatus including an inclined runway for a series of containers movable therealong and relative thereto by gravity, a short reversely inclined runway communicating therewith and arranged to check the passage of containers therein, means for feeding containers upwardly along the latter runway, and means for refrigerating the containers before they arrive at feeding position.

9. Refrigerating apparatus including a runway having an inclined portion along which a series of containers may move by gravity and a dip for containing a predetermined number of containers at rest, together with power operated means for moving containers out of the dip in the runway, said means being arranged to engage and move the containers while they rest on and travel along the runway, and means for refrigerating the containers before they reach the dip.

10. Refrigerating apparatus including a runway having an inclined portion along which a series of containers may travel by gravity and a dip for arresting the movement of the series, together with power operated feeding means for advancing successive containers from the dip, thereby permitting those upon the inclined portion of the runway to resume their movement, said means being arranged to engage and move the containers while they rest on and travel along the runway, and means for refrigerating said latter containers.

11. Refrigerating apparatus including a runway along which a series of containers may advance, power operated means for governing the rate of travel of the containers while they rest on and move along the runway, means for flowing a cooling medium over said containers during a portion of their travel along the runway, and means for washing the containers during another portion of their travel.

12. Refrigerating apparatus including a runway having an inclined portion along which containers may travel by gravity, a dip in said runway, a pipe for flowing cooling medium over the containers upon the inclined portion of the runway, and a tank of cleansing fluid surrounding said dip whereby the refrigerated containers may be washed.

13. Refrigerating apparatus including a plurality of vertically disposed inclined runways each for guiding a series of containers, each runway having a perforated bottom, and means for supplying liquid cooling medium to the containers in the uppermost guideway whereby it may flow over said containers and successively down through the bottoms of the respective runways to refrigerate the containers therein.

14. Refrigerating apparatus including an insulated chamber, a plurality of inclined parallel runways therein, arranged in spaced banks across the chamber, and a perforated pipe for refrigerated brine located above each bank and discharging a defined stream of brine upon the uppermost runways, each of said runways having a longitudinally extending opening in its bottom and a transverse opening located within the chamber near the delivery end of the runway.

15. Refrigerating apparatus including a chamber, a plurality of inclined runways therein located at different levels and each serving to guide a series of containers moving under the influence of gravity, and means for supplying liquid cooling medium to the containers in the uppermost runway, the other runways being so disposed that said cooling medium may fall by gravity successively upon the containers therein.

16. Refrigerating apparatus including an inclined runway along which containers may pass by gravity, and means for directing liquid cooling medium upon the containers in the higher part of the runway, the runway being extended beyond the point of application to permit the cooling medium to drain off the containers before they arrive at the lower end of the runway, and the runway having a flow obstructing portion below said higher part for interrupting the flow of liquid therealong.

17. Refrigerating apparatus including an inclined runway shaped to confine thereon a stream of rapidly flowing liquid cooling medium and to support a series of containers, and means for limiting the movement of the containers to a slow rate while they rest on and travel along the runway, whereby they may be refrigerated by the cooling medium flowing past them.

18. Refrigerating apparatus including a channel shaped runway for guiding a series of containers loosely fitting therein, means for directing liquid cooling medium upon the containers in the higher part of the runway to envelop the containers and then run along the runway passing those located at lower levels, thus refrigerating the series of containers, and means for controlling the rate of travel of the containers in the runway, said last named means performing the controlling operation while the containers rest on and travel along the runway.

19. Refrigerating apparatus including a series of inclined runways arranged one above another and each provided with a longitudinal slot in its bottom, each runway having side walls for guiding a line of rolling containers of food product to be frozen, and means for supplying a liquid refrigerant to the containers in the uppermost runway, said refrigerant flowing out from each runway through the slot therein and upon the containers in the next lower runway.

CLARENCE BIRDSEYE.